(Specimens.)

G. A. J. TIETZ.
MANUFACTURE OF DECORATED HOLLOW GLASSWARE.

No. 345,264. Patented July 6, 1886.

WITNESSES:
A. A. Moore
A. C. Rawlings

INVENTOR
Godfried A. J. Tietz
BY
Connolly Bros
ATTORNEYS

United States Patent Office.

GODFRIED A. JULIUS TIETZ, OF PHILIPSBURG, PENNSYLVANIA, ASSIGNOR TO THE PHOENIX GLASS COMPANY, OF SAME PLACE.

MANUFACTURE OF DECORATED HOLLOW GLASSWARE.

SPECIFICATION forming part of Letters Patent No. 345,264, dated July 6, 1886.

Application filed March 9, 1886. Serial No. 194,587. (Specimens.)

*To all whom it may concern:*

Be it known that I, GODFRIED A. JULIUS TIETZ, a citizen of the United States, residing at Philipsburg, in the county of Beaver and State of Pennsylvania, have invented certain new and useful Improvements in the Manufacture of Decorated Hollow Glassware; and I do hereby declare the following to be a full, clear, and exact description of the invention, reference being had to the accompanying drawings, which form part of this specification.

This invention has relation to the manufacture of hollow glassware, and has for its object to provide hollow glassware — such as globes, shades, table-ware, &c.—ornamented in a peculiar and novel manner.

This invention consists in the production, as a new article of manufacture, of hollow glassware having the ornamentation thereof upon the interior surface of the finished article.

This invention further consists in the novel method and process employed in the production and ornamentation of glassware, in which the ornamentation is produced upon the interior of the article.

The usual and well-known method of manufacturing and ornamenting articles of hollow glassware on which a pattern or design is to be produced in different colors is as follows: If a globe of colored and plain glass is to be manufactured, a sufficient quantity of colored glass to form a very thin cup or bowl of the desired size is taken from the pot or furnace and blown, the greatest skill and care being required in its manipulation, in order that the glass will be of even thickness throughout. After this colored cup or bowl is blown it is placed in a holder and a sufficient quantity of plain glass to form the body of the globe is blown within it, the plain glass adhering to the cup or bowl of colored glass and forming a globe of plain glass having a thin coating or film of colored glass on its exterior surface. If the globe thus formed is to be ornamented by etching, cutting, or engraving, portions of the colored glass are cut, engraved, or eaten away by the acid process, and the ornamentation thus produced upon the exterior surface of the globe.

The above-mentioned process is expensive and difficult for the following reasons: First, the great difficulty in producing the thin colored globe or coating on the exterior surface; second, the great care required in blowing the interior or plain globe without blisters or bubbles between the body and casing.

Figure 1:
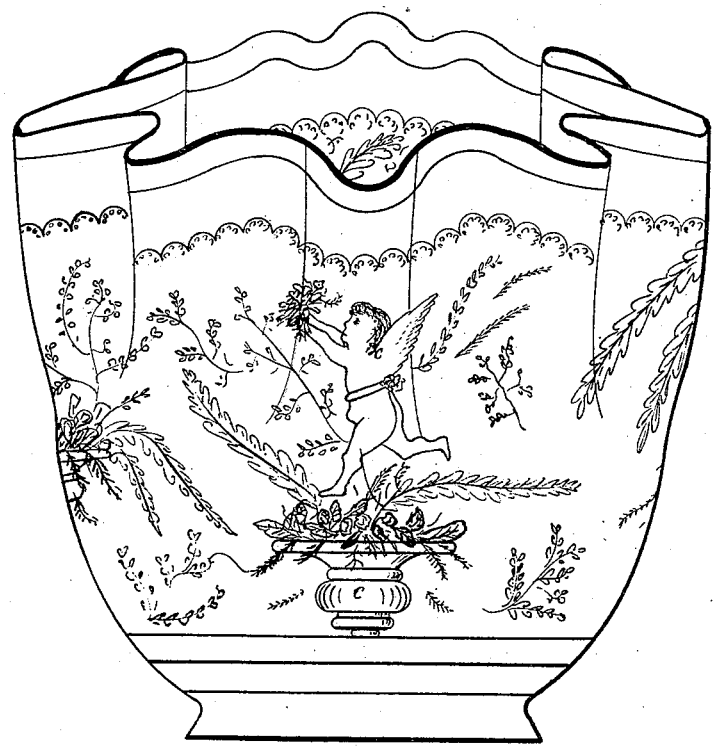
Figure 2:
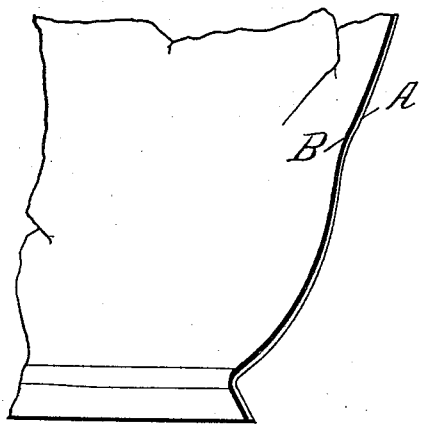

In the accompanying drawings I have illustrated a globe embodying my invention, Figure 1 being a perspective, and Fig. 2 a sectional, view of the same, A designating the plain or uncolored glass, and B the colored glass, having the ornamentation produced thereon by cutting away the parts $c$ $c$, &c.

In carrying my invention into practice I gather a sufficient quantity of colored glass upon the blow-pipe to form the coating or film upon the interior of the finished article. Outside this ball of colored glass I gather sufficient plain glass to form the body of the article. I then at one time blow this combined gathering, the colored glass being evenly spread over the interior of the article. After blowing, the article is molded or formed into the desired shape or configuration. The colored glass being on the interior the ornamentation by etching away the colored glass is produced upon the interior.

In producing the finish upon articles decorated upon the interior it somewhat improves it, instead of, as in an article decorated upon the exterior, deteriorating from its artistic effect.

While I have described my invention as applied to glassware having a combination of colors used in their manufacture, I do not wish to confine myself specifically to that class of goods, as my invention contemplates the interior ornamentation of glass articles when made either of a single color or plain glass, or a combination of both.

Having described my invention, what I desire to claim and secure by Letters Patent is—

1. As a new article of manufacture, a bowl, globe, or other hollow glass article having a finished design etched on its inner surface.

2. As a new article of manufacture, hollow glassware made of two adhering films of different-colored glass, and having a finished design etched on its inner surface and through the inner film.

3. The process of making decorated hollow glassware, which consists in first molding or blowing the article to the required shape, and then finishing and decorating by etching a complete design on its inner surface, substantially as described.

In testimony that I claim the foregoing I have hereunto set my hand this 2d day of March, 1886.

GODFRIED A. JULIUS TIETZ.

Witnesses:
A. H. CONNOLLY,
JOHN F. ATCHESON.